(12) United States Patent
Rossignol

(10) Patent No.: US 11,548,193 B2
(45) Date of Patent: Jan. 10, 2023

(54) METHOD FOR PRODUCING A GUIDING ROD FOR A PUMP

(71) Applicant: SILGAN DISPENSING SYSTEMS LE TREPORT, Le Treport (FR)

(72) Inventor: Eric Rossignol, Chalon sur Saone (FR)

(73) Assignee: SILGAN DISPENSING SYSTEMS LE TREPORT S.A.S., Le Treport (FR)

( * ) Notice: Subject to any disclaimer, the term of this patent is extended or adjusted under 35 U.S.C. 154(b) by 261 days.

(21) Appl. No.: 16/428,812

(22) Filed: May 31, 2019

(65) Prior Publication Data

US 2019/0366376 A1   Dec. 5, 2019

(30) Foreign Application Priority Data

May 31, 2018   (FR) ...................................... 1854672

(51) Int. Cl.
| | |
|---|---|
| B29C 43/02 | (2006.01) |
| B05B 11/00 | (2006.01) |
| B05B 15/30 | (2018.01) |
| B29C 45/00 | (2006.01) |
| B05B 9/047 | (2006.01) |
| B05B 11/04 | (2006.01) |
| B29C 45/14 | (2006.01) |
| B29C 45/26 | (2006.01) |
| B29L 31/06 | (2006.01) |
| B29C 43/52 | (2006.01) |
| B29L 31/00 | (2006.01) |

(52) U.S. Cl.
CPC ........ *B29C 43/027* (2013.01); *B05B 11/3028* (2013.01); *B05B 15/30* (2018.02); *B29C 43/02* (2013.01); *B29C 45/0055* (2013.01); *B05B 9/047* (2013.01); *B05B 11/048* (2013.01); *B29C 45/14* (2013.01); *B29C 45/261* (2013.01); *B29C 2043/026* (2013.01); *B29C 2043/029* (2013.01); *B29C 2043/525* (2013.01); *B29L 2031/06* (2013.01); *B29L 2031/7496* (2013.01)

(58) Field of Classification Search
CPC .......... B29C 45/0055; B29C 2043/029; B29C 43/16; B21G 3/12; B29D 99/0046
See application file for complete search history.

(56) References Cited

U.S. PATENT DOCUMENTS

| | | | | |
|---|---|---|---|---|
| 3,452,905 A | * | 7/1969 | Micallef | B05B 11/3028 222/207 |
| 3,557,269 A | * | 1/1971 | Vawter et al. | B29C 43/027 264/154 |
| 3,786,755 A | * | 1/1974 | Eckstein | B29C 33/0033 102/467 |
| 3,846,522 A | * | 11/1974 | Goldman | B29C 43/361 264/489 |
| 4,210,013 A | * | 7/1980 | Miller | B21J 9/18 100/214 |
| 5,030,402 A | * | 7/1991 | Zachariades | A61F 2/30 264/138 |

(Continued)

*Primary Examiner* — Benjamin A Schiffman

(57) ABSTRACT

The invention relates to a method for producing a guiding rod for a pump for dispensing a fluid product. The rod includes a cylindrical body surmounted by a head. The method a plastic injection molding step to form the cylindrical rod. The method also includes a step of correcting the shape of an upper end of the rod so as to form the head by creating a shoulder at the level of the junction between the head of rod and body.

9 Claims, 4 Drawing Sheets

(56) References Cited

U.S. PATENT DOCUMENTS

| | | | |
|---|---|---|---|
| 5,031,384 A | 7/1991 | Honey | |
| 5,140,823 A * | 8/1992 | Mraz | F17C 3/085 |
| | | | 62/51.1 |
| 5,358,041 A * | 10/1994 | O'Hair | E21B 17/1042 |
| | | | 166/241.4 |
| 5,651,739 A * | 7/1997 | Carlsen | B21G 3/12 |
| | | | 470/129 |
| 5,910,280 A * | 6/1999 | Deason | B29C 45/4407 |
| | | | 264/296 |
| 5,981,619 A * | 11/1999 | Shikinami | A61L 27/46 |
| | | | 523/113 |
| 5,988,967 A * | 11/1999 | Jones | A01L 7/10 |
| | | | 411/487 |
| 6,513,277 B1 * | 2/2003 | Morimoto | A01K 87/00 |
| | | | 43/18.1 R |
| 6,838,041 B2 * | 1/2005 | Rowley | B29B 13/024 |
| | | | 264/266 |
| 6,884,176 B2 * | 4/2005 | Jensen | B21J 13/03 |
| | | | 470/121 |
| 7,104,109 B2 * | 9/2006 | Wasilewski | B21F 5/00 |
| | | | 470/137 |
| 8,087,281 B2 * | 1/2012 | Balazsi | B21K 23/04 |
| | | | 72/404 |
| 8,794,893 B2 * | 8/2014 | Aihara | F16B 19/14 |
| | | | 411/487 |
| 8,998,733 B2 * | 4/2015 | Kim | B21G 3/32 |
| | | | 470/110 |
| 9,915,291 B2 * | 3/2018 | Kurokawa | F16C 3/03 |
| 10,307,937 B2 * | 6/2019 | Regen | G01F 1/58 |
| 2002/0052244 A1 * | 5/2002 | Halstead | B21G 3/30 |
| | | | 470/129 |
| 2006/0147672 A1 * | 7/2006 | Ruiz | B29C 45/0055 |
| | | | 428/137 |
| 2008/0070036 A1 * | 3/2008 | Eisenhardt | B29C 43/021 |
| | | | 428/399 |
| 2010/0191292 A1 * | 7/2010 | DeMeo | A61L 31/14 |
| | | | 606/301 |
| 2011/0233824 A1 | 9/2011 | Alaterre et al. | |
| 2013/0336824 A1 * | 12/2013 | Boes | F04B 45/02 |
| | | | 417/472 |
| 2014/0183229 A1 * | 7/2014 | Van Swieten | B05B 11/3033 |
| | | | 222/256 |
| 2015/0071801 A1 * | 3/2015 | De Regt | F04B 45/02 |
| | | | 417/472 |
| 2015/0306789 A1 * | 10/2015 | Regen | E04B 1/86 |
| | | | 428/36.9 |
| 2015/0314316 A1 | 11/2015 | Kusz et al. | |
| 2017/0246648 A1 * | 8/2017 | Rossignol | A45D 34/00 |
| 2021/0071707 A1 * | 3/2021 | Funck | F16C 7/026 |

\* cited by examiner

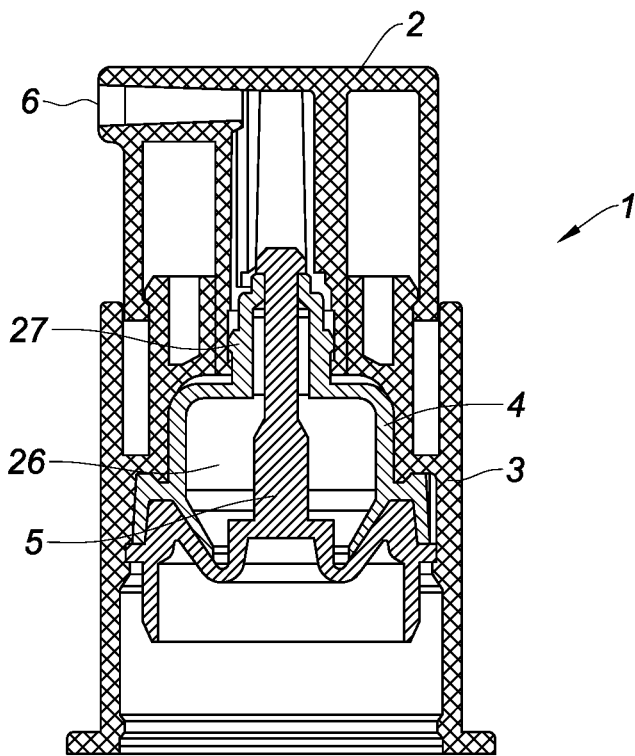
Fig. 1
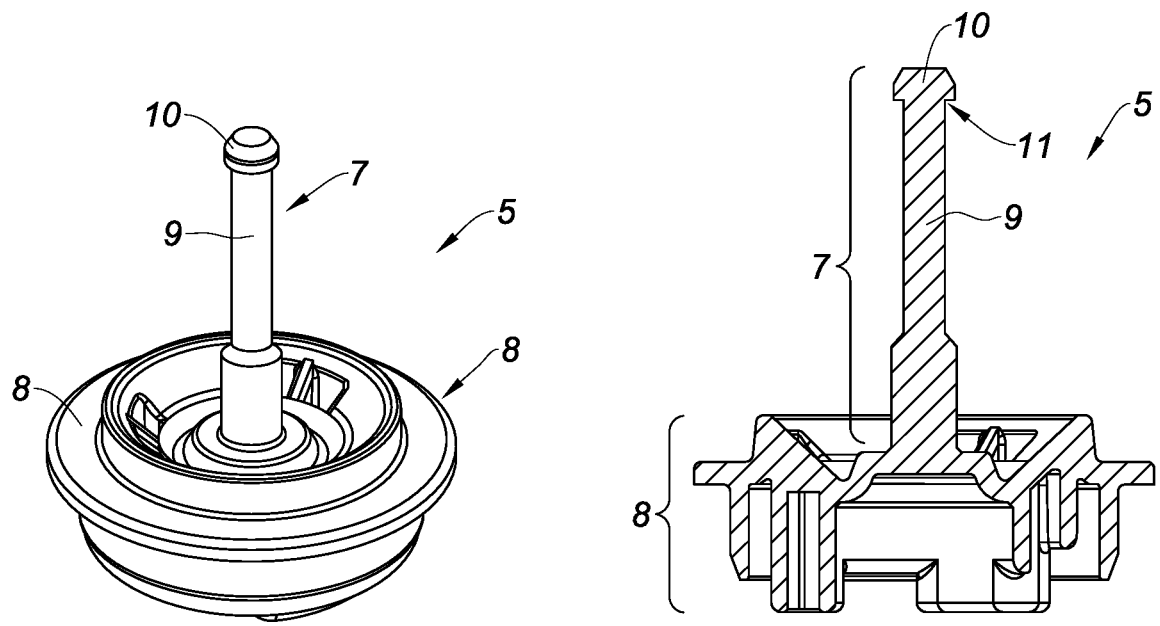
Fig. 2
Fig. 3

METHOD FOR PRODUCING A GUIDING
ROD FOR A PUMP

CROSS REFERENCE TO RELATED
APPLICATIONS

This application claims priority under 35 U.S.C. § 119(a) to French Patent Application Serial Number 1854672, filed May 31, 2018, the entire teachings of which are incorporated herein by reference.

BACKGROUND OF THE INVENTION

Field of the Invention

The invention relates to a method for producing a guiding rod for a pump for dispensing a fluid product, in particular used in a cosmetic product vial.

Description of the Related Art

Certain cosmetic product vials are provided with a pump configured to suction the cosmetic product contained in the tank of the vial in order to dispense it, for example by means of a nozzle or by a simple opening. The product can thus be extracted or sprayed from the vial in order to allow its application. The pump is often actuated by means of a pushbutton on which the user exerts a pressure to trigger the functioning of the pump. A pump includes, in particular, a pumping chamber, of which the volume varies to make it possible for the suctioning of the product into the chamber through an inlet orifice, when the volume increases, then the expulsion thereof outside of the chamber through an outlet orifice, when the volume of the chamber decreases. The product exits from the chamber into a dispensing conduit, which leads it to the opening or the nozzle usually arranged on the pushbutton.

Different types of pumps are known, in particular pumps of which the pumping chamber is defined mainly by a flexible membrane. The volume of the chamber is controlled by deforming the membrane. In the non-deformed configuration of the membrane, the volume of the chamber is at a maximum. When the membrane is deformed, the volume of the chamber decreases, preferably to a quite low volume such that a maximum amount of product exits from the chamber. The elements of the pump are preferably designed and made of plastic material. The deformable membrane is made of one single piece, of which the deformation is guided to ensure an optimal folding, without needing to constrain the membrane in a compartment or to give it a complex shape.

For this, the pump includes a guiding rod passing through the membrane, the membrane sliding along the rod when it is subjected to the deformation such that the membrane is retained radially with respect to the rod, and it is moved only about the axis of the rod. The guiding rod thus makes it possible to guide the membrane when it is subjected to the deformation, and to avoid the membrane being folded in a damaging manner for the pump. This guiding rod includes a guiding head having edges with respect to the body of the rod on which the membrane slides. This head acts as a high abutment for the membrane. The base of the rod is generally connected to a support on which the membrane rests.

The rod/support assembly is obtained by plastic injection, with a mold including two mobile compartments on either side of the rod and forming, in particular, the edges of the head of the guiding rod. Such a mold is known from the prior art. During demolding, the rod cannot be demolded in one single plate. Indeed, the demolding is made impossible by the edges of the head. Consequently, the mold includes two compartments which are removed laterally relative to the axis of the rod to release the rod and the head thereof. The demolded rod thus includes a joint plane which extends over the whole length to the localization of the junction between the two compartments. This joint plane is a line, of which the radial thickness can reach several hundred millimetres, which is sufficient to deteriorate, in a damaging manner, the sealing of the connection of the flexible membrane with the guiding rod. On the other hand, a mold provided with mobile compartments is difficult to produce and expensive.

BRIEF SUMMARY OF THE INVENTION

The aim of the present invention consists of modifying the production method, by simplifying the molded part, namely the rod, and by reworking it during a second step. The present invention aims to overcome the different disadvantages stated above, by means of a method for producing a guiding rod for a pump for dispensing a fluid product, the rod including a cylindrical body surmounted by a head.

This production method is characterised, mainly in that it includes the following steps:
   a plastic injection molding step to form the cylindrical rod;
   a step of correcting the shape of an upper end of the rod, so as to form the head by creating a shoulder at the level of the junction between the head and the rod body.

Advantageously, the plastic injection consists of a single injection.

Advantageously, the plastic injection is carried out by means of a mold with a single plate. Such a mold does not include compartments.

Advantageously, the demolding of the rod is carried out in a single operation. Thus, a lateral movement of molding portions such as compartments relative to the axis of the rod is not necessary.

The main idea of this invention consists of molding a cylindrical guiding rod with no retaining head. The upper end of the rod thus has a cylindrical geometry, so that it is possible to easily demold using a mold, without compartments, with one single plate dedicated to the molding of the rod. Such a mold is cheaper, which has a real economic advantage. Since the rod no longer has any joint plane, there is no longer any risk of damaging the sealing of the connection of the flexible membrane with the guiding rod. The functioning of the pump is thus improved.

The rod head will then be formed during the later step of correcting the shape. This shape correction step is carried out without adding any material. It is the upper end of the rod in itself which is deformed and which becomes a head.

According to a first possible configuration, the shape of the rod head is made by hot heading during the shape correction step. This shape correction step includes a phase of heating the upper end of the rod until the plastic material is melted, then a phase of pushing back the molten material.

During the step of correcting shape by heading, the upper end of the rod is put into contact with a heating surface of a heading tool having a central axis X, the rod being arranged in the extension of this axis X.

This heating surface is flat.

This heating surface can have a heating cavity, wherein the upper end of the rod is inserted.

Preferably, the cavity has a hemispherical shape to form a head with a hemispherical appearance. Any other head shape can be considered, from the time when it has an edge or a shoulder with respect to the body, so as to be able to subsequently retain the deformable membrane.

During the pushing back phase, whatever the profile of the heating surface, the heading tool is moved in translation along the axis X in the direction of the rod so as to exert a pressure on the molten rod head, leading to a movement of the molten material along the rod body in the direction of movement of the heading tool, so as to form the shoulder between the head and the rod body.

Optionally, the rod body is clamped in a jaw, and the upper end of the rod is pushed back until the lower face of the head in formation is pressed on an upper flat face of the jaw, such that the lower face of the head is flat. This lower face of the head forms the shoulder.

According to a second possible configuration, the shape of the rod head is made by cold heading the material of the upper end of the rod during the shape correction step.

The upper end of the rod is arranged opposite a heading tool designed and made of a material that is more resistant than plastic, of the metal type, and of which the surface opposite the upper end of the rod has a sharp annular edge with a diameter less than the nominal diameter of the rod, as well as an annular recess surrounding the annular edge, the heading tool having a central axis X, the rod being arranged in the extension of this axis X.

Advantageously, the heading tool is moved in translation along the axis X in the direction of the rod until it cuts the material on the upper end of the rod along a predefined course, the cut surplus material being housed in the annular recess of the heading tool so as to form the head of the rod with a shoulder with respect to the body.

The surplus material takes the shape of the annular recess.

After the shape correction step, the maximum diameter of the head of the rod is greater than the nominal diameter of the rod. Therefore, there is actually a shoulder, against which the membrane can abut.

Advantageously, the production method includes an additional step of inserting the rod in a funnel provided for this purpose in a flexible membrane belonging to the pump, the insertion step being carried out between the injection step and the shape correction step. This makes it possible to insert the rod in the membrane without damaging the latter and thus to guarantee an optimal sealing between the rod and the membrane.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a cross-sectional view of a pump with a deformable membrane guided by a guiding rod;

FIG. 2 is a perspective view of a rod/support assembly such as represented in FIG. 1;

FIG. 3 is a cross-sectional view of a rod/support assembly corresponding to FIG. 2;

DETAILED DESCRIPTION OF THE INVENTION

Figure 4:
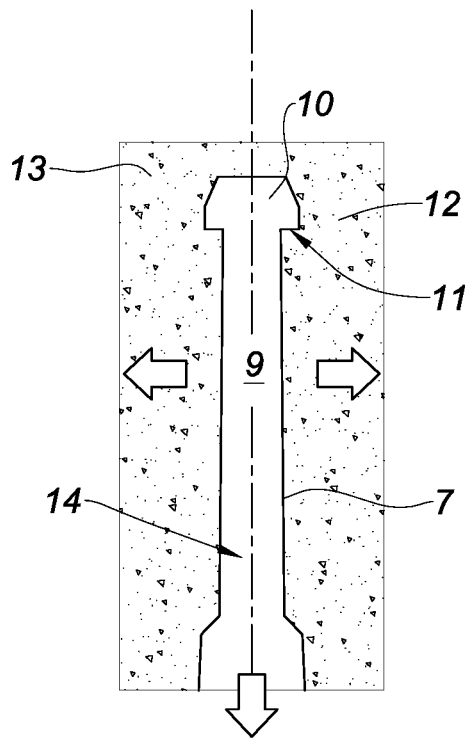
FIG. 4 is a cross-sectional view of a rod in a mold with two compartments according to the prior art.

FIG. 1 shows a pump 1 for a container, in particular a vial intended to contain a cosmetic product. The pump 1 includes a pushbutton 2, a sleeve 3, a deformable membrane 4, and an assembly 5 formed of a rod 7 and a support 8.

The pushbutton 2 has the function of making it possible for the actuation of the pump 1 by a user. The pushbutton 2 here has a cylindrical body equipped with an opening 6 for dispensing the product and an upper supporting wall on which the user exerts a pressure to actuate the pump 1, the pushbutton 2 being inserted into the sleeve 3 during the actuation.

The pump 1 further includes a pumping chamber 26 with a variable volume defined at least partially by the deformable membrane 4. The pump 1 functions by making the volume of the chamber 26 vary, by elastically deforming the membrane 4 between an initial state in the shape of a dome represented in FIG. 1, wherein the chamber 26 has a maximum volume, and a deformed state (not represented), wherein the volume of the chamber 26 is at a minimum.

The deformable membrane 4 rests on the support 8. The rod 7 of the assembly 5, corresponds to a guiding rod 7 of the membrane 4 which extends from the support 8. This rod 7 is arranged substantially along the axis of the sleeve 3. The guiding rod 7 passes through the membrane 4 and exits through a funnel present at the top of the dome, such that the membrane 4 slides along the rod 7, when it is subjected to the deformation, the rod 7 passing through the chamber 26 substantially along the longitudinal axis of the chamber 26. The rod 7 has the function of guiding the membrane 4 when it passes from the initial state to the deformed state, then from the deformed state to the initial state. The dome is thus configured to be able to fold the top thereof towards the base thereof.

As shown more clearly in FIGS. 2 and 3, the rod 7 includes a cylindrical body 9 and surmounted, at the level of an upper free end, by a head 10. There is a radial shoulder 11 between the body 9 and the head 10, so as to create an edge 11 against which the membrane 4 abuts. Thus, the membrane 4 cannot pass beyond the end of the rod 7, as it is retained by the edge 11, the head 10 has the appearance of a mushroom.

As illustrated in FIG. 4, the body 9 and the head 10, forming the complete rod 7, are generally molded in a mold including two compartments 12, 13 which are removed laterally relative to the axis of the rod 7 to release the rod 7 and the head 10 thereof, as illustrated by the solid arrows. Indeed, demolding with one single plate, without compartments, is made impossible by the edges 11 of the head 10, as the direction of removing the rod 7 is axial, as illustrated by the hollow arrow.

Thus, the demolded rod 7 includes a joint plane 14 which extends over the whole of the length of the rod 7, at the level of the junction between the two compartments 12, 13, as represented by the dotted lines.

In the present invention, the rod 7 no longer has any joint plane. Indeed, in the method for producing the rod 7, there is first a step of plastic injection, which makes it possible to produce the cylindrical body 9 of the guiding rod 7. This body 9 is fully cylindrical, from one end to the other. There is no head 10. It is therefore possible to mold, using a mold with one single plate, without compartments. Since there is no head 10, the cylindrical body 9 can be axially removed at the demolding, with ease, in one single operation.

The body 9 of the rod 7 therefore has no roughness on the surface due to the molding. It is smooth and uniform.

The plastic injection consists of one single injection, preferably.

Once the molding/demolding step has ended, a step of correcting the shape of the upper end 23 thereof follows, so as to form the head 10 of the rod 7.

According to a first possible configuration, such as represented in FIGS. 5a to 5c, and 8a to 8c, this correction is made by a heading method. This method includes a phase of heating the head 10 of the rod 7 until the plastic material is melted, then a phase of pushing back the molten material.

To do this, a heading tool 15 is used, which consists of a heating part having a free end arranged opposite the upper end 23 of the rod 7. The heating part and the rod 7 are aligned along one same central axis X.

The free end of the heating part 15 has a flat surface 16.

Figure 8A:
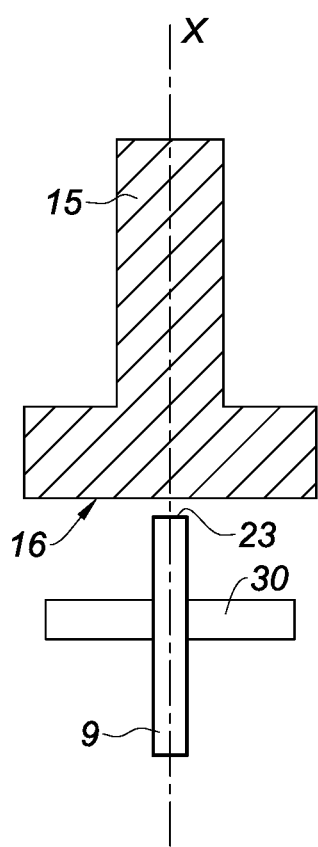
FIGS. 8a to 8c show the different steps of the method for producing the rod head according to the first configuration of the invention, with a variant.

In FIG. 8a, the heading tool 15 is arranged at a distance from the upper end 23 of the rod 7.

Figure 8B:
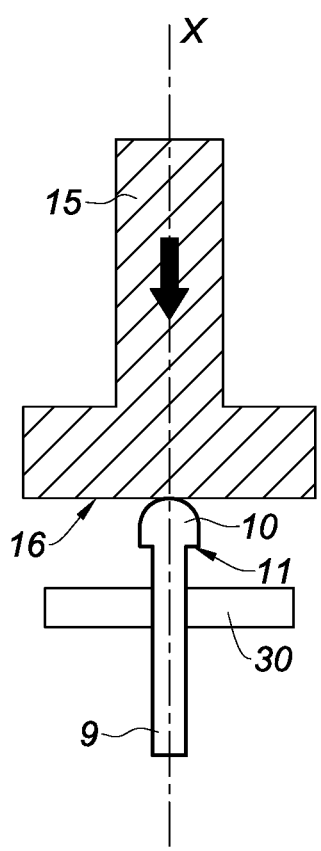

In FIG. 8b, the heading tool 15 is moved axially along the axis X until the upper end 23 of the rod 7 touches the flat heating surface 16 of the heading tool 15. It could also be considered to move the rod 7 axially, while the heading tool 15 remains fixed.

The upper end 23 of the rod 7 is thus heated, until the material thereof melts, and is deformed under the effect of the heat. The material of the end flows towards the bottom, and forms a cap, which corresponds to a head 10. Thus, a rod 7 is obtained with a rounded free end. The bottom of the cap forms a shoulder 11 with the body 9 of the rod 7.

Figure 8C:
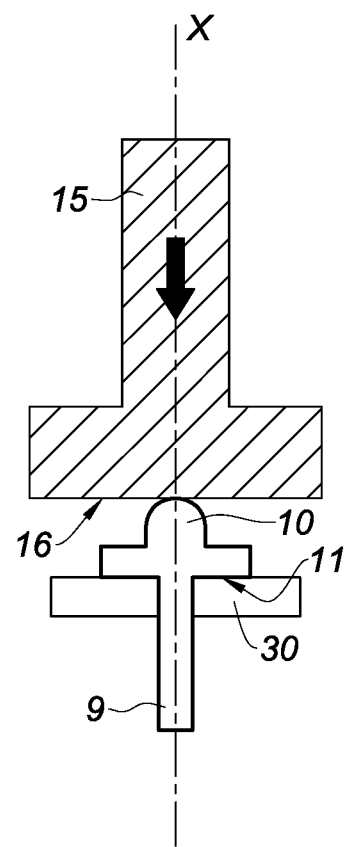

To increase this shoulder and make it straight, it is possible, in a following step illustrated in FIG. 8c, to retain the rod 7 body 9 clamped in a jaw 30, and to continue to axially move the heading tool 15 to also push back the head being formed, until the lower face thereof is pressed onto an upper flat face of the jaw 30, such that the lower face of the head 10 is flat. In this case, the shoulder 11 is actually pronounced at the level of the junction between the head 10 and the body 9 of the rod 7.

In a variant, the flat surface 16 of the free end of the heating part has a cavity 17 of hemispheric shape, corresponding to the future shape of the head 10 of the rod 7.

Figure 5A:
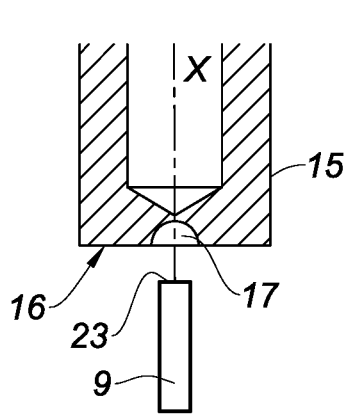
FIGS. 5a to 5c show the different steps of the method for producing the rod head according to a first configuration of the invention.

In FIG. 5a, the heading tool 15 is arranged at a distance from the upper end 23 of the rod 7.

Figure 5B:
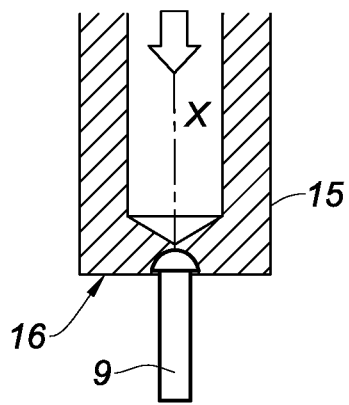

In FIG. 5b, the heading tool 15 is axially moved until the upper end 23 of the rod 7 is inserted inside the cavity 17 of the heading tool 15. It could also be considered to axially move the rod 7, while the heading tool 15 remains fixed.

The upper end 23 of the rod 7 is thus heated, until the material thereof melts, and is deformed to take the shape of the cavity 17. Thus, a rod 7 with a rounded, even hemispheric free end is obtained. Any other cavity 17 shape, and therefore head 10 shape, can be considered.

Figure 5C:
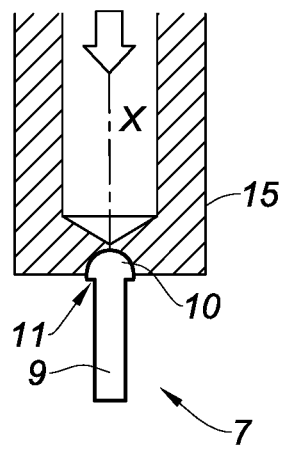

In FIG. 5c, the heading tool 15 is moved axially again, along a predefined small course, and in the direction of the rod 7, so as to exert a pressure on the head 10 of the molten rod 7, which leads to a movement of the molten material along the body 9 of the rod 7 in the movement direction of the heading tool 15. This makes it possible to fill the whole cavity 17 with the molten material.

Thus, a hemispherical-shaped head 10 is obtained, with a pronounced edge 11, with respect to the body 9. Indeed, the maximum diameter of the cavity 17 is greater than the diameter of the rod 7 body 9. Consequently, there is a shoulder 11 between the body 9 and the rod 7 head 10, corresponding to the edge 11 against which the membrane 4 of the pump 1 abuts.

In the same manner as above, to increase this shoulder and make it straight, it is possible, in a following step, not illustrated, but equivalent to FIG. 8c, to retain the rod 7 body 9 clamped in a jaw 30, and to continue to move the heading tool 15 axially to also push back the head being formed until the lower face thereof is pressed onto an upper flat face of the jaw 30, such that the lower face of the head 10 is flat. In this case, the shoulder 11 is pronounced at the level of the junction between the head 10 and the body 9 of the rod 7.

The heading tool can be a sonotrode of an ultrasonic welding machine. The energy from the ultrasound causes the heating of the upper end 23 of the rod 7.

According to a second possible configuration, such as represented in FIGS. 7a to 7d, this correction is cold formed, by pushing back of the material of the upper end 23 of the rod 7.

Figure 6:
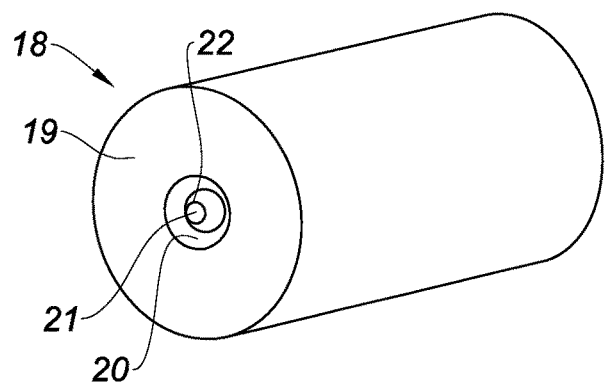
FIG. 6 illustrates, in perspective, a pushing back tool.

For this, a pushing back tool 18 is used, visible in FIG. 6, and designed in a material which is more resistant than plastic, of the metal type. This tool 18 consists of a cylindrical part having a free end arranged opposite the upper end 23 of the rod 7. The pushing back tool 18 and the rod 7 are aligned along the same central axis X. The free end of this pushing back tool 18 has a flat surface 19, wherein is hollowed a recess 20 of annular shape surrounding a central orifice 21. The metal material remaining at the level of the junction between the recess 20 and the central orifice 21 is sufficiently thin to form a sharp, annular edge 22, like a blade. The diameter of this annular edge 22 is less than the diameter of the body 9 of the rod 7.

Figures 7A, 7B, 7C, 7D:
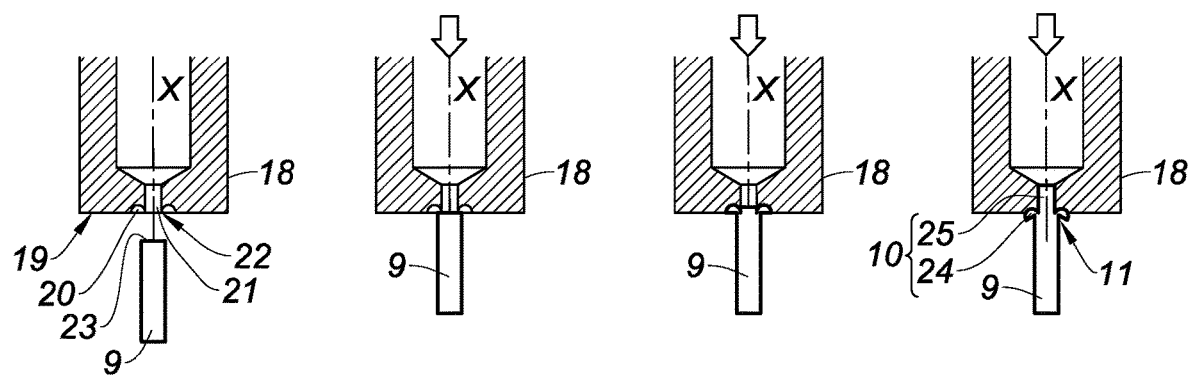
FIGS. 7a to 7d show the different steps of the method for producing the rod head according to a second configuration of the invention.

In FIG. 7a, the pushing back tool 18 is arranged at a distance from the upper end 23 of the rod 7.

In FIG. 7b, the pushing back tool 18 is axially moved until the upper end 23 of the rod 7 comes into contact with the sharp edge 22. It could also be considered to axially move the rod 7, while the pushing back tool 18 remains fixed.

Then, the pushing back tool 18 is axially moved along a predefined course, and in the direction of the rod 7, until cutting the material of the upper end 23 of the rod 7, as illustrated in FIGS. 7c and 7d. The central portion 25 of the upper end 23 of the rod 7 thus enters into the central orifice 21 of the pushing back tool 18, while the peripheral portion 24 of the upper end 23 of the rod 7 consists of the cut surplus material 24, which thus is housed in the annular recess 20 of the pushing back tool 18.

As the advancement of the pushing back tool 18 progresses with respect to the rod 7, this surplus material 24 enters into the recess 20 and is bent according to the shape of the recess 20. The surplus material 24 thus forms an annular crown overhanging the body 9 of rod 7 and forming an edge 11 with respect to the body 9 of rod 7.

In this case, the head 10 of rod 7 corresponds, not to a mushroom, but to a nipple 25 surrounded by a crown 24. Therefore, there is a shoulder 11 between this rod 7 head 10 and the body 9 of rod 7.

Other recess 20 and crown shapes can be considered.

In practice, after the step of molding by plastic injection of the support 8/rod 7 assembly 5, there is the step of inserting the cylindrical rod 7 into the funnel 27 provided for this purpose in the deformable flexible membrane 4 belonging to the pump 1. Once the rod 7 is inserted into the membrane 4, the shape correction step can be passed onto, so as to create the head 10 of rod 7, and such that the membrane 4 can no longer exit beyond the head 10 of rod 7. Thus, the membrane 4 is confined between the support 8 and the head 10 of rod 7.

From the insertion step, a tube is positioned along the axis of the rod 7 and presses on the deformable flexible membrane 4 such that this, with there being no rod head, is retained in a compressed position. The heading tool or the pushing back tool is introduced inside the tube and slides along it to the end 23 of the rod 7 to carry out the shape correction operation.

The configurations shown in the figures cited are only possible examples, not at all limiting, of the invention which, on the contrary, includes embodiment and design variants in the scope of a person skilled in the art.

Of note, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", and/or "including," when used in this specification, specify the presence of stated features, integers, steps, operations, elements, and/or components, but do not preclude the presence or addition of one or more other features, integers, steps, operations, elements, components, and/or groups thereof.

As well, the corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

1. A method for producing a guide rod for a pump, comprising:
   injection molding a cylindrical guide rod comprising an upper end;
   providing a heading tool, comprising:
      a central axis;
      a heating surface;
   aligning the cylindrical guide rod along the central axis;
   moving the heading tool along the central axis until the heating surface comes into contact with the upper end of the cylindrical guide rod, wherein the heating surface exerts pressure on the upper end of the cylindrical guide rod;
   heating the upper end of the cylindrical guide rod until a portion melts forming a melted upper end portion;
   forming a head from the melted upper end portion;
   removing the heading tool; and
   cooling the head.

2. The method of claim 1, wherein providing a heading tool further comprises providing a heading tool comprising a flat heating surface.

3. The method of claim 1, wherein providing a heading tool further comprises providing a heading tool comprising a heating surface having a hemispheric shape.

4. The method of claim 1, wherein injection molding a cylindrical guide rod further comprises injection molding a cylindrical guide rod connected to a support.

5. The method of claim 1, further comprising retaining the cylindrical guide rod in a clamp before moving the heading tool along the central axis.

6. A method for producing a pump, comprising:
   injection molding an assembly comprising a rod and a support;
   providing a deformable membrane comprising a funnel opening at a top of a dome;
   inserting an upper end of the rod through the funnel opening until an end of the deformable membrane opposite the funnel rests on the support, the support and deformable membrane defining a pumping chamber;
   providing a heading tool, comprising:
      a central axis;
      a heating surface;
   aligning the upper end of the rod along the central axis;
   moving the heading tool along the central axis into contact with the upper end of the rod, wherein the heating surface exerts pressure on the upper end of the rod;
   heating the upper end of the rod until a portion of the rod melts forming a melted upper end portion;
   forming a head from the melted upper end portion;
   removing the heading tool; and
   cooling the head.

7. The method of claim 6, wherein providing a heading tool comprising a heating surface further comprises providing a flat heating surface.

8. The method of claim 6, wherein providing a heading tool comprising a heating surface further comprises providing a heating surface comprising a heating cavity.

9. The method of claim 6, wherein forming a cap further comprises forming a cap having a maximum diameter greater than a nominal diameter of the rod.

\* \* \* \* \*